Figure 1:
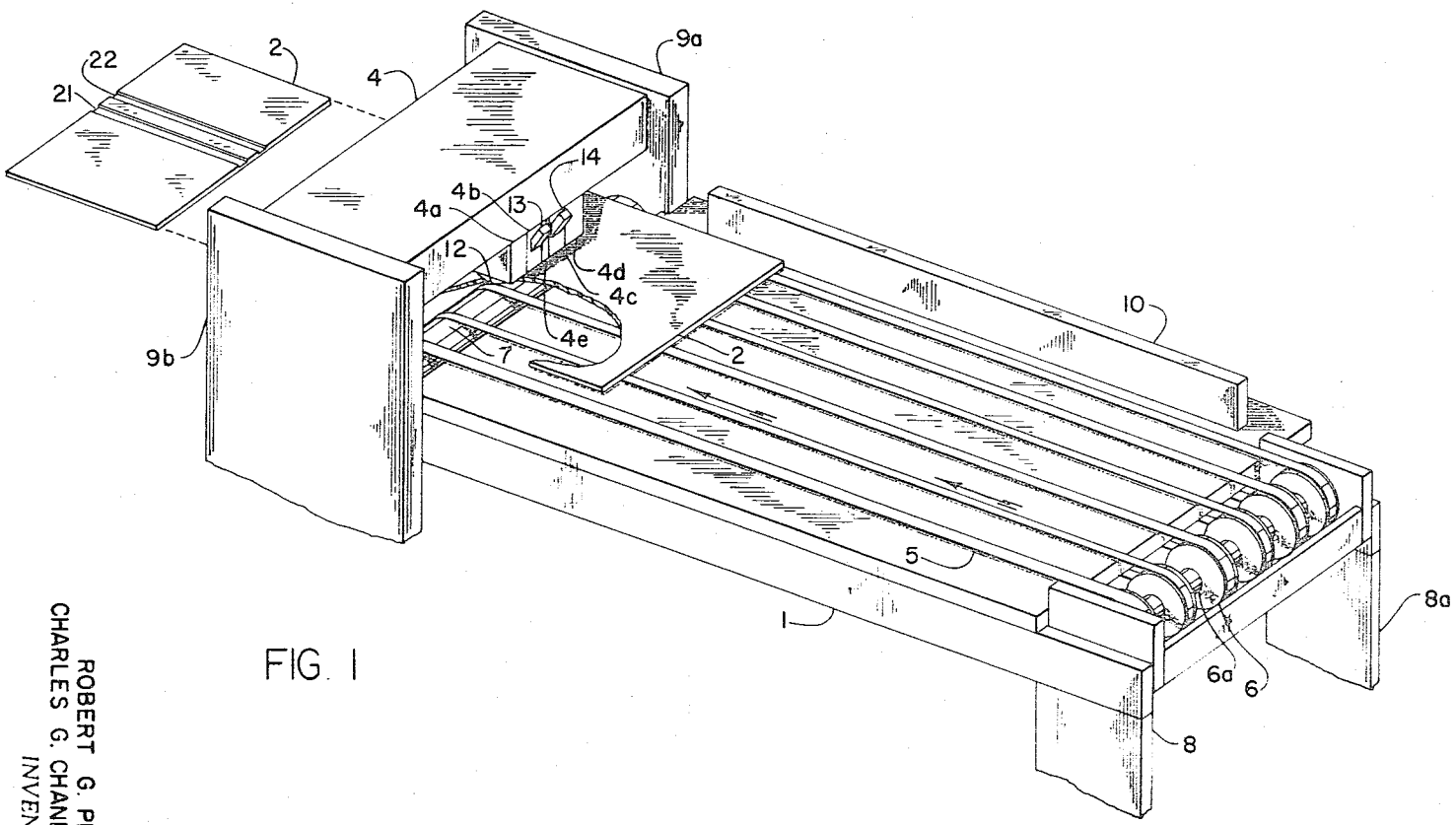
Figure 3:
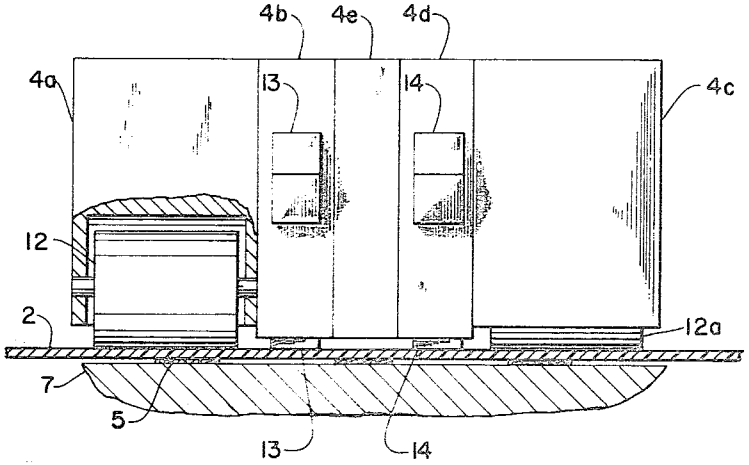
Figure 2:
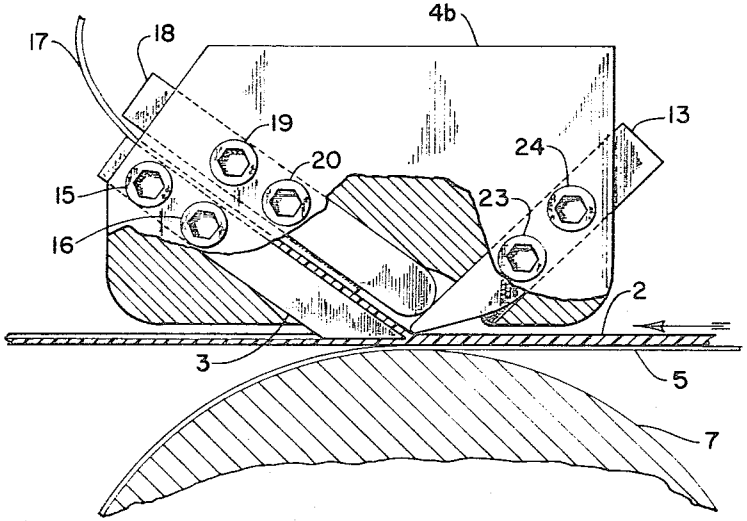

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1209

T892,003

METHOD AND MECHANISM FOR MACHINING HINGES IN PLASTIC SHEETING

Robert G. Peace, Ryers Lane, Matawan, N.J. 07747, and Charles G. Chandler, 100 Walton Court, Kingsport, Tenn. 37663

Filed May 22, 1970, Ser. No. 39,756
Int. Cl. B26d *3/06*
U.S. Cl. 83—5
2 Sheets Drawing. 10 Pages Specification

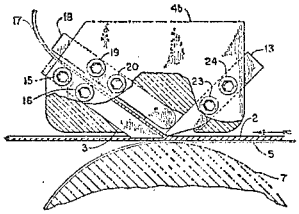

A method and mechanism for producing hinges in plastic sheeting primarily for the purpose of producing plastic notebooks, book covers, book backs and similar articles. The method involves the use of a machine which has a table or other structure for supporting an endless belt or other means of feeding a plastic sheet into contact with a groove-cutting element at high linear speeds. The cutting element is fixed but adjustably and angularly mounted on the supporting means in such manner as to bring it into skiving contact with and to skive out one or more longitudinal grooves or channels in the sheet. The machine is provided with a cooperating presser foot, also adjustably and angularly mounting on the supporting means in such manner as to bear down on the plastic sheet at the point of cutting. By operating the machine plastic sheets of suitable thickness may have one or more grooves cut therein at a high rate of speed, the portion or strip at the bottom of the cut in each case forming a flexible portion or "hinge," after which the sheet may be cut to any desired size to make a notebook cover, book back or similar article.

Nov. 23, 1971 R. G. PEACE ET AL T892,003

METHOD AND MECHANISM FOR MACHINING HINGES IN PLASTIC SHEETING

Filed May 22, 1970 2 Sheets-Sheet 1

ROBERT G. PEACE
CHARLES G. CHANDLER
INVENTORS

BY Charles L. Good

ATTORNEY

METHOD AND MECHANISM FOR MACHINING HINGES IN PLASTIC SHEETING

Filed May 22, 1970 2 Sheets-Sheet 2

ROBERT G. PEACE
CHARLES G. CHANDLER
INVENTORS

BY Charles L. Good

ATTORNEY